United States Patent
Kumar et al.

(10) Patent No.: US 10,097,374 B2
(45) Date of Patent: Oct. 9, 2018

(54) SYSTEM AND METHOD FOR ENABLING TERMINAL EQUIPMENTS TO USE ADSL AND LTE INFRASTRUCTURES FOR INTERNET ACCESS

(71) Applicant: Tejas Networks Ltd., Bangalore (IN)

(72) Inventors: Vijaya Kumar, Karnataka (IN); Firoz Khan Patan, Karnatzkam (IN); Rajesh Purohit, Rajasthan (IN); Sivan Ramachandran, Karnataka (IN); Rakesh Apparaju, Andra Pradesh (IN); Venkateswara Reddy, Andhra Pradesh (IN)

(73) Assignee: Tejas Networks Ltd., Bangalore (IN)

( * ) Notice: Subject to any disclaimer, the term of this patent is extended or adjusted under 35 U.S.C. 154(b) by 96 days.

(21) Appl. No.: 15/069,693

(22) Filed: Mar. 14, 2016

(65) Prior Publication Data

US 2016/0277211 A1 Sep. 22, 2016

(30) Foreign Application Priority Data

Mar. 19, 2015 (IN) .......................... 1356/CHE/2015

(51) Int. Cl.
| | |
|---|---|
| *H04L 12/46* | (2006.01) |
| *H04J 11/00* | (2006.01) |
| *H04L 12/14* | (2006.01) |
| *H04L 29/12* | (2006.01) |

(52) U.S. Cl.
CPC .......... *H04L 12/4633* (2013.01); *H04J 11/00* (2013.01); *H04L 12/1446* (2013.01); *H04L 61/2015* (2013.01); *H04L 61/6022* (2013.01)

(58) Field of Classification Search
CPC ............. H04L 12/4633; H04L 12/1446; H04L 61/2015; H04L 61/6022; H04J 11/00
See application file for complete search history.

(56) References Cited

U.S. PATENT DOCUMENTS

| | | | | |
|---|---|---|---|---|
| 2012/0147834 A1* | 6/2012 | Zisimopoulos | ... | H04L 29/12066 370/329 |
| 2012/0281591 A1* | 11/2012 | Gu | ...................... | H04L 12/2859 370/254 |
| 2013/0028139 A1* | 1/2013 | Sanneck | ............. | H04L 41/0803 370/254 |
| 2013/0097418 A1* | 4/2013 | Bhatt | .................. | H04L 63/0892 713/151 |
| 2013/0097674 A1* | 4/2013 | Jindal | ................ | H04L 63/0876 726/4 |
| 2013/0346788 A1* | 12/2013 | Haddad | ................... | H04L 41/50 714/4.2 |
| 2014/0328161 A1* | 11/2014 | Haddad | ................ | H04W 24/04 370/219 |
| 2014/0369198 A1* | 12/2014 | Rinne | .................. | H04W 40/02 370/235 |
| 2016/0241489 A1* | 8/2016 | Zheng | ................ | H04L 61/6063 |
| 2017/0279664 A1* | 9/2017 | Zhang | .................. | H04L 12/283 |

\* cited by examiner

*Primary Examiner* — Peter Chau
(74) *Attorney, Agent, or Firm* — Amster, Rothstein & Ebenstein LLP

(57) ABSTRACT

Systems and methods of the present disclosure enable LTE unaware devices to access Internet by reusing ADSL billing and OSS infrastructure in a LTE deployment by enabling the LTE to provide a transparent Internet pipe through which multiple terminal equipments (TEs) can be connected to a single CPE, and at the same time enabling each user to be billed separately using the existing broadband remote access servers (BRAS).

12 Claims, 2 Drawing Sheets

SYSTEM AND METHOD FOR ENABLING TERMINAL EQUIPMENTS TO USE ADSL AND LTE INFRASTRUCTURES FOR INTERNET ACCESS

FIELD

The present disclosure relates generally to the domain of Internet access to terminal equipments (TEs) and, more particularly, to systems and methods for enabling terminal equipments to access Internet over Long-Term Evolution (LTE) using Asymmetric Digital Subscriber Line (ADSL) infrastructure.

BACKGROUND

The background description includes information that may be useful in understanding the present invention. It is not an admission that any of the information provided herein is prior art or relevant to the presently claimed invention, or that any publication specifically or implicitly referenced is prior art.

Wireless communication technologies are used in connection with many applications involving laptop computers, cellular telephones, user equipment, tablets, etc. Wireless communication technologies are tasked with handling increased amounts of data traffic, where the types of data being transported through mobile wireless networks have changed dramatically.

In existing communication systems, CPE (Customer Premise Equipment, referred to as CPE) comprises a home gateway, an access point (Access Point, referred to as AP), a modem (modem), a router, and data cards, wherein with the development of home broadband services, CPE applications in home network have widened. The current WLAN (Wireless Local Area Network, referred to WLAN networks) needs to rely on long-term evolved packet core network (Long Term Evolution-Evolved Packet Core, referred to as LTE-EPC network) resources. LTE is the new broadband access technology of 4'th generation, which can be used to provide internet access solution, wherein if an operator goes for green field LTE deployment, it has to consider multiple challenges. One challenge relates to a situation when the operator has ADSL and wants to migrate to LTE but then the operator cannot re-use existing Billing and OSS Framework. In another challenge, if the operator wants to bill each user, then each user must have LTE aware devices, in which case it is not possible to use common CPE (Customer Premise Equipment) that can provide Internet access to all tenants in the same premise, and separate CPEs need to be provided for each user.

In existing architecture, a terminal equipment (TE) is connected with a LTE CPE and in implementation, can send a DHCP discover request to the CPE, which may or may not pass the DHCP request to Evolved Packet Core (EPC), wherein, in the event the CPE passes on the packet to the EPC through packet gateway (PGW), the PGW drops the packet since the source address of the TE does not match with the LTE CPE address.

There is therefore a need in the art to provision a system and method that provides Internet access to LTE unaware devices such as PC, Laptop (referred to as terminal equipments (TEs)) by re-using ADSL billing and OSS infrastructure to deploy LTE based Internet Access.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF INVENTION

It is an object of the present disclosure to provide Internet to LTE unaware devices.

It is an object of the present disclosure to provide Internet to LTE unaware devices by reusing ADSL billing and OSS infrastructure to deploy LTE based Internet access.

It is an object of the present disclosure to enable billing of an LTE unaware device.

SUMMARY

Systems and methods of the present disclosure enable LTE unaware devices to access Internet by reusing ADSL billing and OSS infrastructure in a LTE deployment by enabling the LTE to provide a transparent Internet pipe through which multiple terminal equipments (TEs) can be connected to a single CPE, and at the same time enabling each user to be billed separately using the existing broadband remote access servers (BRAS).

In an aspect of the present disclosure, architecture of the present disclosure can be configured in a LTE deployment, wherein one or more terminal equipments (TEs) can be connected with a LTE CPE (Customer Premises Equipment) and send a message such as a Dynamic Host Configuration Protocol (DHCP) Discover/Request to the LTE CPE. The LTE CPE can then forward the DHCP Discover/request (message) over the existing default bearer with eNodeB (base station), wherein the CPE can note down the MAC address and Port over which the DHCP request (message) has been received, and can then forward the DHCP request (message) as an IP packet to packet data network gateway (PGW) using say a GPRS tunneling protocol (GTP) tunnel. In an embodiment, PGW can be configured as a DHCP relay to forward (broadcast) the DHCP discover/request (message) to the existing OSS infrastructure/BRAS side. In an embodiment, before forwarding the DHCP discover/request, PGW can add PGW-External Interface IP address GIAddress (GIADDR) so that the DHCP server on the BRAS side can allocate IP address in the same subnet. PGW can note down MAC address of TE which can be used to co-relate DHCP Offer/ACK (response).

In an aspect, the PGW can address the same IP address as DHCP relay address in the DHCP discover/request (message) so that the DHCP server can send unicast reply instead of broadcast reply. PGW can also note down the CPE over which the DHCP discover/request (message) was received. After the existing BRAS side receives the DHCP discover/request, it would send back the DHCP offer/ACK (response) to the PGW, which can then forward the ACK over bearer of CPE on which corresponding DHCP discover/request (message) had been received by the PGW, wherein PGW can also note down mapping of IP addresses of TE and CPE with help of MAC address noted down. CPE can receive the DHCP Offer/ACK (response) and forward the same to the TE over which corresponding DHCP discover/request (message) had come. After this, the PGW can forward all IP Packets received from that TE over the external interface and can receive all the IP Packets destined to the TE and forward them over the GTP tunnel to the corresponding CPE, which can in turn forward the packets to the correct TE.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
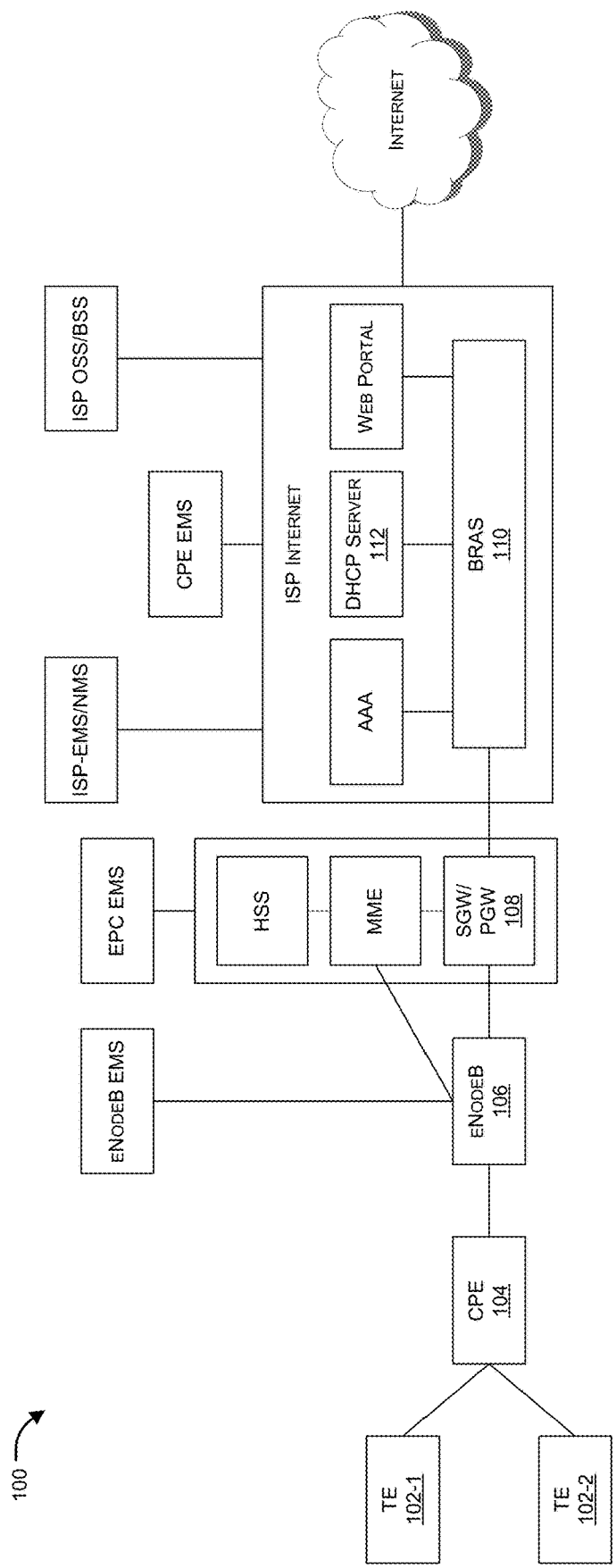
FIG. 1 illustrates an exemplary network architecture of proposed LTE system in accordance with an embodiment of the present disclosure.

Systems and methods of the present disclosure enable LTE unaware devices to access Internet by reusing ADSL billing and OSS infrastructure in a LTE deployment by enabling the LTE to provide a transparent Internet pipe through which multiple terminal equipments (TEs) can be connected to a single CPE, and at the same time enabling each user to be billed separately using the existing broadband remote access servers (BRAS).

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps.

Alternatively, the steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Systems and methods of the present disclosure enable LTE unaware devices to access Internet by reusing ADSL billing and OSS infrastructure in a LTE deployment by enabling the LTE to provide a transparent Internet pipe through which multiple terminal equipments (TEs) can be connected to a single CPE, and at the same time enabling each user to be billed separately using the existing broadband remote access servers (BRAS).

In an aspect of the present disclosure, architecture of the present disclosure can be configured in a LTE deployment, wherein one or more terminal equipments (TEs) can be connected with a LTE CPE (Customer Premises Equipment) and send a message such as a Dynamic Host Configuration Protocol (DHCP) Discover/Request to the LTE CPE. The LTE CPE can then forward the DHCP request (message) over the existing default bearer with eNodeB (base station), wherein the eNodeB can note down the MAC address and Port over which the DHCP request (message) has been received, and can then forward the DHCP request (message) as an IP packet to packet data network gateway (PGW) using say a GPRS tunneling protocol (GTP) tunnel. In an embodiment, PGW can be configured as a DHCP relay to forward (broadcast) the DHCP discover/request (message) to the existing OSS infrastructure/BRAS side. In an embodiment, before forwarding the DHCP discover/request (message), PGW can add PGW-External Interface IP address GIAddress (GIADDR) so that the DHCP server on the BRAS side can allocate IP address in the same subnet.

In an aspect, the PGW can address the same IP address as DHCP relay address in the DHCP discover/request so that the DHCP server can send unicast reply instead of broadcast reply. PGW can also note down the CPE over which the DHCP discover/request was received. After the existing BRAS side receives the DHCP discover/request (message), it would send back the DHCP offer/ACK (response) to the PGW, which can then forward the Offer/ACK (response) over bearer of CPE on which corresponding DHCP discover/request (message) had been received by the PGW, wherein PGW can also note down mapping of IP addresses of TE and CPE. CPE can receive the DHCP Offer/ACK (response) and forward the same to the TE over which corresponding DHCP discover/request (message) had come. After this, the PGW can forward all IP Packets received from that TE over the external interface and can receive all the IP Packets destined to the TE and forward them over the GTP tunnel to the corresponding CPE, which can in turn forward the packets to the correct TE.

FIG. 1 illustrates an exemplary network architecture of proposed LTE in accordance with an embodiment of the present disclosure. In an aspect of the present disclosure, architecture 100 can be configured in a LTE deployment, wherein one or more terminal equipments (TEs) 102-1, 102-2, 102-3, collectively referred to as 102 hereinafter, can be connected with a LTE CPE 104 (Customer Premises Equipment) and send a message such as a Dynamic Host Configuration Protocol (DHCP) Discover/Request to the LTE CPE. The LTE CPE 104 can then forward the DHCP request (message) over the existing default bearer with eNodeB 106 (base station), wherein the eNodeB 106 can note down the MAC address and Port over which the DHCP request (message) has been received, and can then forward the DHCP request (message) as an IP packet to packet data network gateway (PGW) 108 using say a GPRS tunneling protocol (GTP) tunnel. In an embodiment, PGW 108 can be configured as a DHCP relay to forward (broadcast) the DHCP discover/request (message) to the existing OSS infrastructure/BRAS side 110. In an embodiment, before forwarding the DHCP discover/request (message), PGW 108 can add PGW-External Interface IP address GIAddress (GIADDR) so that the DHCP server 112 on the BRAS side 110 can allocate IP address in the same subnet.

In an aspect, the PGW 108 can address the same IP address as DHCP relay address in the DHCP discover/request (message) so that the DHCP server 112 can send unicast reply instead of broadcast reply. PGW 108 can also note down the CPE 104 over which the DHCP discover/request (message) was received. After the existing BRAS side 110 receives the DHCP discover/request (message), it would send back the DHCP offer/ACK (response) to the PGW 108, which can then forward the Offer/ACK (response) over bearer of CPE 104 on which corresponding DHCP discover/request had been received by the PGW 108, wherein PGW 108 can also note down mapping of IP addresses of TE 102 and CPE 104. CPE 104 can receive the DHCP Offer/ACK and forward the same to the TE 102 over which corresponding DHCP discover/request had come. After this, the PGW 108 can forward all IP Packets received from that TE 102 over the external interface and can receive all the IP Packets destined to the TE 102 and forward them over the GTP tunnel to the corresponding CPE 104, which can in turn forward the packets to the correct TE 102.

According to one embodiment, one should appreciate that the present structure/architecture is completely exemplary in nature and any other configuration is completely within the scope of the present disclosure. For instance, an additional bearer can be configured between the eNodeB 106 and EPC for supporting different QoS classes. In another embodiment, architecture of the present disclosure can also handle the error such as when the DHCP server 112 sends back a NACK, wherein the PGW 108 and/or CPE 104 can be configured to act as DHCP relay to cover all such miscellaneous or error scenarios.

Figure 2:
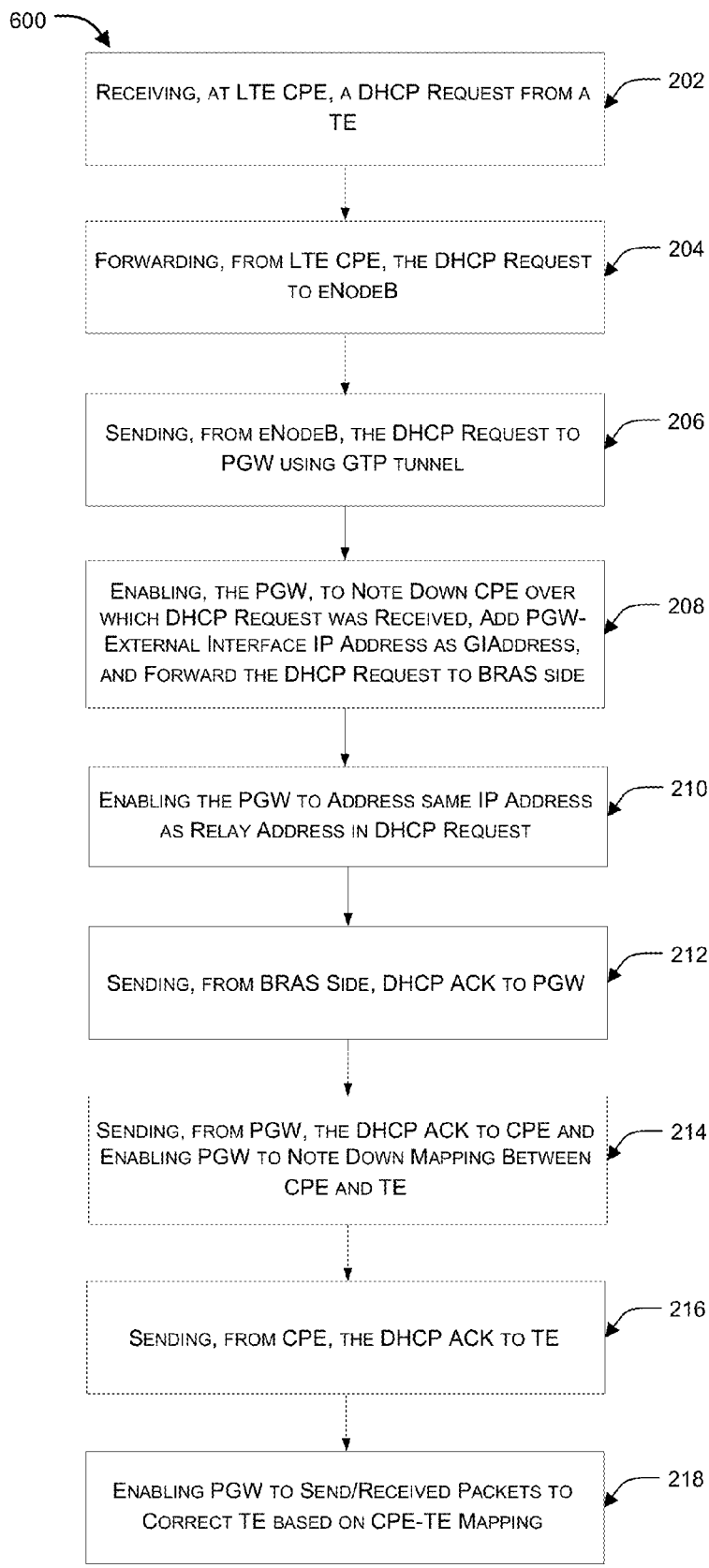
FIG. 2 illustrates an exemplary flow diagram of the proposed LTE system using existing BRAS for Internet access to TEs in accordance with an embodiment of the present disclosure.

FIG. 2 illustrates an exemplary flow diagram 200 of the proposed LTE system using existing BRAS for Internet access to TEs in accordance with an embodiment of the present disclosure. At step 202, LTE CPE can receive a message such as a Dynamic Host Configuration Protocol (DHCP) Discover/Request from a TE, wherein at step 204, the LTE CPE can forward the DHCP request (message) over an existing default bearer to an eNodeB (base station). At step 206, the eNodeB can note down MAC address and Port over which the DHCP request (message) has been received and can then forward the DHCP request (message) as an IP packet to packet data network gateway (PGW) using say a GPRS tunneling protocol (GTP) tunnel.

At step 208, PGW 108 can note down the CPE 104 over which the DHCP discover/request (message) was received, can add PGW-External Interface IP address as GIAddress (GIADDR), and can then forward (broadcast) the DHCP discover/request (message) to the existing OSS infrastructure/BRAS side. At step 210, the PGW can address the same IP address as DHCP relay address in the DHCP discover/request so that the DHCP server can send unicast reply instead of broadcast reply. At step 212, the existing BRAS side can send back DHCP offer/ACK (response) to the PGW, wherein, at step 214, the PGW can forward the ACK over bearer of CPE 104 on which corresponding DHCP discover/request (message) had been received by the PGW 108 and can also note down mapping of IP addresses of TE and CPE. At step 216, CPE can receive the DHCP Offer/ACK (response) and forward the same to the TE 102. At step 218, the PGW can forward all IP Packets received from that TE over the external interface and can receive all the IP Packets destined to the TE and forward them over the GTP tunnel to the corresponding CPE, which can in turn forward the packets to the correct TE.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

Advantages of the Invention

The present disclosure provides Internet to LTE unaware devices.

The present disclosure provides Internet to LTE unaware devices by reusing ADSL billing and OSS infrastructure to deploy LTE based Internet access.

The present disclosure allows separation of LTE customer premise devices to be managed as infrastructure equipment while the end user connected to these customer premise devices are offered a transparent LTE pipe for internet access.

The present disclosure allows multiple such end user devices to be connected to single LTE customer premises equipment and yet be separately billable by the operator.

While embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

We claim:

1. A Long-Term Evolution (LTE) system for enabling Internet access comprising:
   one or more terminal equipments (TEs) operatively coupled with a customer premises Equipment (CPE), wherein a first of said one or more terminal equipments is configured to send a message to said CPE;
   a packet data network gateway (PGW) operatively coupled with said CPE wherein said PGW is configured to receive said message from said CPE, and broadcast said message to an existing broadband remote access server (BRAS) side, wherein said PGW receives a response to the message from a server of said BRAS side and sends said received response to said CPE for transmission of said received response to said first of said one or more terminal equipments, wherein said PGW maintains a mapping between said CPE and said first of said one or more terminal equipments.

2. The system of claim 1, wherein said message is a Dynamic Host Configuration Protocol (DHCP) Discover/Request.

3. The system of claim 1, wherein said response is a Dynamic Host Configuration Protocol (DHCP) offer/ACK.

4. The system of claim 1, wherein said CPE sends said message to an eNodeB over an existing default bearer, wherein said eNodeB notes Media Access Control (MAC) address and port over which said message is received and then forwards said message to said PGW.

5. The system of claim 4, wherein said eNodeB sends said message to said PGW over a General Packet Radio Service (GPRS) tunneling protocol (GTP) tunnel.

6. The system of claim 5, wherein said PGW sets PGW-External Interface Internet Protocol (IP) address as Gateway IP Address (GIAddress) (GIADDR) to enable said server on said BRAS side to allocate IP address in same subnet.

7. The system of claim 6, wherein said PGW forwards IP packets received from said first of said one or more terminal equipments over an external interface, and wherein said PGW receives IP packets destined to said first of said one or more terminal equipments to forward the IP packets destined to said first of said one or more terminal equipments over said GTP tunnel to said CPE, and wherein said CPE in turn forwards said IP packets destined to said first of said one or more terminal equipments to said first of said one or more terminal equipments.

8. The system of claim 6, wherein said PGW addresses the message to same IP address as that of DHCP relay address in said message to enable said server to send a unicast reply.

9. The system of claim 1, wherein said PGW notes down Media Access Control (MAC) address of said CPE over which said message is received.

10. The system of claim 1, wherein said PGW notes down mapping of IP addresses of said first of said one or more terminal equipments and said CPE.

11. A method for enabling Internet access in a Long-Term Evolution (LTE) system comprising the steps of:
receiving, at a customer premises equipment (CPE), from a first of one or more terminal equipments, a Dynamic Host Configuration Protocol (DHCP) Discover/Request;
receiving, at a packet data network gateway (PGW) that is operatively coupled with said CPE, said DHCP Discover/Request from said CPE, and broadcast said DHCP request to an existing broadband remote access server (BRAS) side, wherein said PGW receives DHCP offer/ACK from a server of said BRAS side to send said received DHCP offer/ACK to said CPE for transmission of said received DHCP offer/ACK to said first of said one or more terminal equipments, wherein said PGW maintains a mapping between said CPE and said first of said one or more terminal equipments.

12. The method of claim 11, wherein said CPE sends said DHCP Discover/Request first to an eNodeB over an existing default bearer, wherein said eNodeB notes Media Access Control (MAC) address and port over which said DHCP Discover/Request is received, and then forwards said DHCP Discover/Request to said PGW, and wherein said eNodeB sends said DHCP Discover/Request to said PGW over a General Packet Radio Service (GPRS) tunneling protocol (GTP) tunnel, further wherein said PGW sets PGW-External Interface Internet Protocol (IP) address as GIAddress to enable said server on said BRAS side to allocate IP address in same subnet.

* * * * *